United States Patent [19]

Goodale

[11] Patent Number: 5,263,515
[45] Date of Patent: Nov. 23, 1993

[54] DEVICE FOR REPAIRING A TUBE

[76] Inventor: James R. Goodale, 3420 Smithtown Rd., Suwanee, Ga. 31074

[21] Appl. No.: 828,706

[22] Filed: Jan. 31, 1992

[51] Int. Cl.⁵ .............................................. F16L 55/16
[52] U.S. Cl. ...................................... 138/98; 138/89; 138/97
[58] Field of Search ............... 138/89, 91, 97, 98; 29/402.01, 402.02, 402.09, 402.14, 402.15, 402.17

[56] References Cited

U.S. PATENT DOCUMENTS

| | | | |
|---|---|---|---|
| 1,180,714 | 4/1916 | Hall | 138/97 |
| 2,672,161 | 3/1954 | Brauer | 138/97 |
| 2,672,162 | 3/1954 | Brauer | 138/97 |
| 2,810,401 | 10/1957 | Stansbury | 138/89 |
| 3,267,967 | 8/1966 | Guthrie | 138/97 |
| 3,678,560 | 7/1972 | Dufour et al. | 138/97 |
| 4,285,368 | 8/1981 | Terrill et al. | 138/89 |

*Primary Examiner*—James E. Bryant, III
*Attorney, Agent, or Firm*—Michael V. Drew

[57] ABSTRACT

A threaded rod (40) extends through two blocks (20, 22). Each block (20, 22) has a bore. The bore of the first of the two blocks (20) is not threaded and is prevented from moving when the threaded rod is turned. The bore of the second of the two blocks (22) is threaded and engages the threads of the threaded rod (40). As the rod (40) is turned clockwise or counter clockwise, the second block (22) responds by moving toward or away from the first block (20). One side of each block (20, 22) is connected to a plate (24, 26) which is contoured to fit the inner wall of a tube (11) or pipe. The blocks (20, 22) and plates (24, 26) are pivotally connected by bars (30). A cold welding compound is applied to the plates and the device is inserted into a tube (11) to be repaired. When the plates (24, 26) are aligned over the portion of the tube (11) to be repaired, the threaded rod (40) is rotated so that the second block (22) moves toward the first block (20) causing the plates (24, 26) to move outward. The threaded rod (40) is rotated until the device (10) is secured and a firm union between the plates (24, 26) and wall of the tube (11) is achieved.

7 Claims, 1 Drawing Sheet

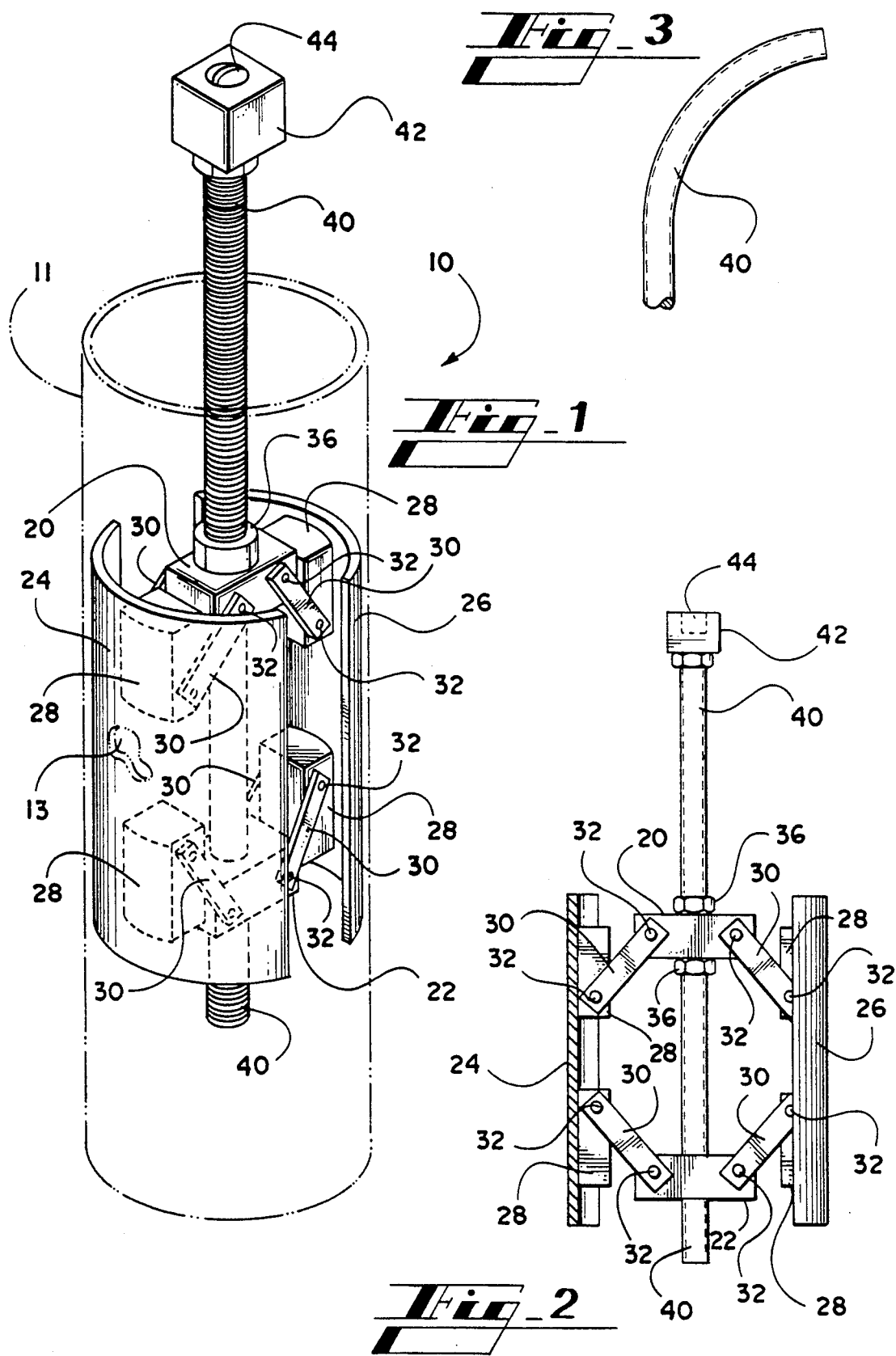

5,263,515

DEVICE FOR REPAIRING A TUBE

TECHNICAL FIELD OF THE INVENTION

The present invention relates to a method and device for repairing a tube, and more particularly to method and device for repairing a tube using an insert which covers an opening in the tube.

BACKGROUND OF THE INVENTION

Tubes, such as pipes, water pipes and the like, often develop ruptures, holes, cracks, fissures, fractures or other openings that undesirably affect the performance of the tube. For example, tubes such as the fire tubes in an industrial hot water heater are vertically oriented in the water chamber of the heater and act as a conduit for hot gases emanating from a combustion chamber below the fire tubes. Water is heated when heat from the hot gases rising in the fire tubes is transferred to the water which surrounds the fire tubes. Often, one of the fire tubes develops a hole that causes water to leak out of the water chamber into the fire tube. It is a problem to repair a fire tube because they are normally encased within a tank or chamber and the entire tube cannot be easily reached. A present method of repairing a fire tube in an industrial hot water heater is to partially, or fully, dismantle the heater to remove and repair the problem fire tube. Thus, it would be desirable to have a convenient means for repairing a tube or pipe such as a fire tube in an industrial water heater that does not require removal of the problem tube or pipe from the environment in which it is installed.

SUMMARY OF THE INVENTION

It is an object of the invention to provide a means for repairing an opening in the wall of a tube.

It is a further object of the invention to provide a means for repairing an opening in the wall of a tube that is not easily accessible without removing the tube from the environment in which it is installed.

In the present invention a threaded rod extends through two blocks. Each block has a bore extending through its center. The bore of the first of the two blocks is not threaded and is prevented from moving when the threaded rod is turned. The bore of the second of the two blocks is threaded and engages the threads of the threaded rod. As the rod is turned clockwise or counter clockwise, the second block responds by moving toward or away from the first block. One side of each block is connected to a plate which is contoured to fit the inner wall of a tube or pipe. The blocks and plates are pivotally connected by bars. A cold welding compound is applied to the plates and the device is inserted into a tube to be repaired. When the plates are aligned over the portion of the tube to be repaired, the threaded rod is rotated so that the second block moves toward the first block causing the plates to move outward. The threaded rod is rotated until the device is secure and a firm union between the plates and wall of the tube is achieved.

Other aspects, objects, features, and advantages of the present invention will become apparent to those skilled in the art upon reading the detailed description of preferred embodiments.

BRIEF DESCRIPTION OF THE DRAWINGS

FIG. 1 is an isometric illustration of a device for repairing a tube according to a preferred embodiment of the invention.

FIG. 2 is a front view of the invention of FIG. 1, without the plates.

FIG. 3 is an illustration of an alternative embodiment rod of FIG. 1.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments taken in conjunction with the accompanying drawings. In the drawings, the same numerals refer to like features.

In a preferred embodiment of the invention a device for repairing a tube uses a dual toggle joint arrangement to force a pair of plates outward from a central rod. Referring first to FIG. 1, therein is illustrated a device for repairing a tube or the like 10 within a tube 11 that has a fissure, or opening, 13 to be mended. The principal component of the device 10 is a dual toggle joint arrangement formed by a pair of blocks 20, 22 acting with a pair of plates 24, 26. A threaded rod 40 provides the action that forces the plates outward. The first block 20 has a bore through its center for allowing the rod 40 to pass through. The second block 22 has a bore which is threaded for engaging the rod 40. The first block 20 is preventing from moving along the rod 40 because it does not engage the threads of the rod 40 and additionally because it is held in place on the rod 40. The first block 20 may be held in place by any suitable means; however, the preferred embodiment uses a pair of nuts 36 which are screwed onto the rod 40 on either side of the block 20. The nuts 36 are fixed in place by suitable means such as the application of an adhesive. When each nut 36 is fixed in place on either side of the first block 20, as the rod 40 is rotated, the nuts 36 turn with the rod 40 and the first block 20 remains in place while the rod 40 rotates through its center. The second block 22 moves along the rod 40 when the rod 40 is rotated because of the cooperation between the threads of the two components. Rotation of the rod 40 in one direction will cause the second block 22 to move toward the first block 20, and reversal of the direction of rotation will cause the second block 22 to move away from the first block 20. One side of each block 20, 22 is pivotally connected to a plate 24, 26 that is contoured and adapted to fit the wall of the tube 11 that is being repaired. Interface blocks 28, which are essentially blocks attached to the plates 24, 26, provide an appropriate point of connection for pivot pins 32. Pivot pins 32 are used to pivotally affix connecting bars 30 to the first and second blocks 20, 22 and to the interface blocks 28. Optimally, the first block 20, second block 22, and connecting bars 30 are designed in dimensions that help to maintain the plates 24, 26 in parallel alignment. This can be accomplished by using first and second blocks 20, 22 of the same dimensions, interface blocks of the same dimensions and connecting bars 28 of the same dimensions, and, further, connecting the components at approximately the same locations. In the preferred embodiment of FIG. 1, the connecting bars 30 connecting the first block 20 to the plates 24, 26 extend from the top portion of the first block 20 to bottom edges of the interface blocks 28. The connecting bars 30 connecting the second block 22 to the plates 24, 26 extend from the bottom portion of the second block 22 to top edges of the interface blocks 28. The arrangement of elements described immediately above causes the plates 24, 26 to be pulled inward, essentially parallel, when the rod 40 is turned to move the second block 22 away from the first block 20. When the rod 40 is turned to move the second block 22 toward the first block 20, the plates 24, 26 are forced outward, essentially parallel. If the orientation of the connecting bars 30 is reversed and the device 10 will still function properly but the directions of rotation of the rod 40 necessary to move the plates 24, 26 outward would be reversed. Although the rod 40 may be rotated by hand, an adapter 42 provides a convenient means for grasping the rod 40 for rotation by hand or for attaching a torque-applying tool such as a wrench to the rod 40. The end of the rod 40 may also be bent slightly into a right-angular configuration to provide a means for rotating the rod 40. In the preferred embodiment, the adapter 42 has a threaded bore for receiving an extension rod. An extension rod is used when the device 10 must be inserted to great distances from the end of the tube 11.

Referring now to FIG. 2, the elements of the device 10 described above are shown in a front view. The plates 24, 26 are not shown to better illustrate the interconnection between the connecting bars 30 and the interface blocks 28. In particular, FIG. 2 reveals the arrangement of the nuts 36 with respect to the first block 22.

Referring now to FIG. 3, therein is illustrated the top portion of the rod 40 bent to a right-angular configuration to form a convenient handle for rotating the rod 40, as mentioned above.

The method of using the device 10 is simple. The location of the fissure, hole or other opening 13 to be plugged is ascertained. An appropriate length of rod 40 or rod attachments are employed to place the device 10 over the fissure 13 in the tube 11. Although in many instances it may be possible to put the device 10 in place and effectively plug the fissure 13 without the use of adhesives or other compounds, in the preferred embodiment of a method of use a cold welding compound is applied to the surface of each plate 24, 26 prior to the insertion of the device 10 into the tube. Although any compound which will help the device 10 remain in place and help prevent the passage of substances coming into contact with the tube 11 is suitable, a cold weld compound such as Velodur works well. A cold weld compound promotes an extremely durable bond between the plates 24, 26 and the wall of the tube. Velodur is a registered trademark, and the compound is manufactured by American Durwell Sales, Inc. Once the device 10 is inserted into the tube 11, the rod 40 is rotated to move the second block 22 toward the first block, forcing the plates 24, 26 outward into the wall of the tube 11. In the preferred embodiment the device 10 remains in place, tightened over the fissure 13. The welding compound bonds the plates 24, 26 to the tube 11 wall and also provides a seal around the fissure 13. The device 10 and method of use described above enable a tube 11 to be repaired without removing the tube from its environment.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A device for repairing an opening in a tube comprising:
   a first block member defining a bore therethrough;
   a second block member defining a threaded bore therethrough;
   a threaded member extending through said bore of said first block member and said threaded bore of said second block member engaging said threaded bore of said second block member;
   means for preventing said first block member from translating with respect to said threaded member;
   a first plate and a second plate adapted for closely engaging a wall of the tube; and
   a first interface member affixed proximate a top edge of said first plate, a second interface member affixed proximate a top edge of said second plate, a third interface member affixed proximate a bottom edge of said first plate, a fourth interface member affixed proximate a bottom edge of said second plate, a first pair of connecting members each having a first end pivotally connected proximate a bottom edge of said first interface member and having a second end pivotally connected proximate a top edge of said first block member, a second pair of connecting members each having a first end pivotally connected proximate a bottom edge of said second interface member and having a second end pivotally connected proximate a top edge of said first block member, a third pair of connecting members each having a first end pivotally connected proximate a top edge of said third interface member and having a second end pivotally connected proximate a bottom edge of said second block member, and a fourth pair of connecting members each having a first end pivotally connected proximate a top edge of said fourth interface member and having a second end pivotally connected proximate a bottom edge of said second block member.

2. The invention of claim 1, wherein said means for preventing said first block member from translating with respect to said threaded member comprises a nut fixedly attached to said threaded member on either side of said first block member.

3. The invention of claim 1, further comprising an adapter for turning said threaded member affixed at an end thereof.

4. The invention of claim 3, wherein said adapter for turning said threaded member is adapted for receiving a torque applying tool.

5. The invention of claim 3, wherein said adapter for turning said threaded member further comprises means for receiving an extension member.

6. The invention of claim 1, further comprising an adhesive applied to outer surfaces of said first and second plates.

7. The invention of claim 6, wherein said adhesive is a cold weld compound.

* * * * *